Patented Apr. 5, 1932

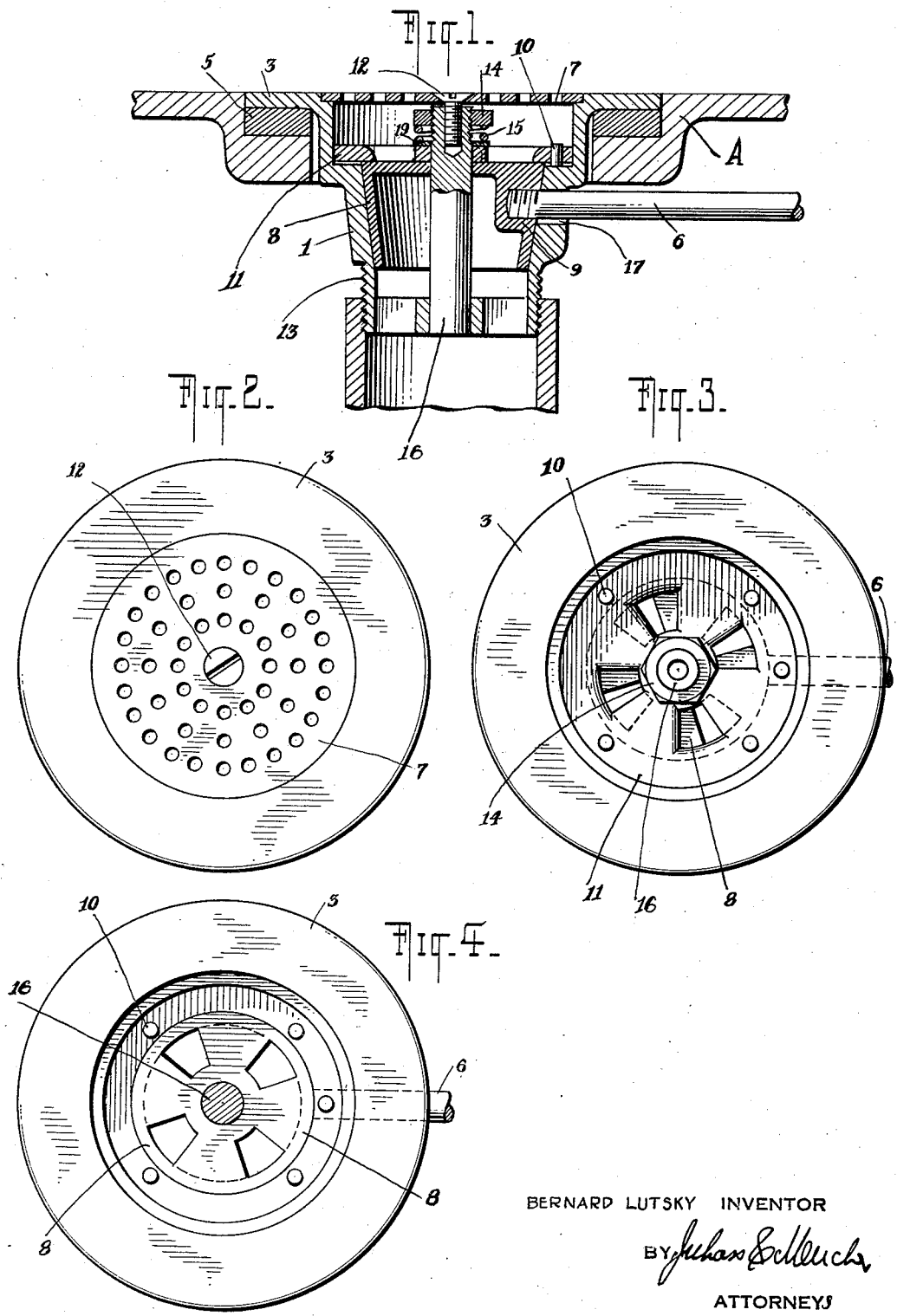

1,852,123

UNITED STATES PATENT OFFICE

BERNARD LUTSKY, OF NEW YORK, N. Y.

VALVE FITTING FOR PLUMBING FIXTURES

Application filed April 16, 1931. Serial No. 530,685.

Generally, the invention relates to valve fittings adapted for communication from the outlet or port of a plumbing fixture to the standard drain pipe, the invention relating to a modified form of a valve fitting disclosed in my copending application, Serially Numbered 443,849, filed April 12, 1930. More particularly, the invention encompasses and relates to a type of fitting used in conjunction with kitchen-sinks, basins, tubs and the like, wherein the valve portion is manually operated, externally to the bed and receptacle of the plumbing fixture. The purpose of the said valve fitting is to drain or stop the flow of water in the particular receptacle with which the valve fitting cooperates.

Primarily, the object of the invention is the provision of a valve fitting furnished with a casing and valve elements, the latter being operable externally to the fixture to which the said fitting is associated and communicating directly to the usual or standard drain pipe. The casing of the fitting is provided with a counter-bore at its upper surface to provide a seat for a strainer, which latter is coextensive with the bed of the receptacle or plumbing fixture.

A further object of the invention is the provision of a valve fitting wherein the parts are constructed and assembled in a novel and unique manner, so as to assure the positive opening and closing of the waste port by means of valve elements therebeneath, without possible leakage therefrom or damage thereto from particles and other waste materials discarded into the kitchen sink, tub, basin or like receptacle. The fitting is made from a minimum number of parts, which are easy of assemblage, substantial in structure, and economic to manufacture.

A further object of the invention is the provision for permanent affixation of the casing of the valve fitting to the port of the plumbing fixture and to the terminal of the usual or standard drain pipe, while the adjustable valve elements at the same time are easily accessible and removable for purposes of repair and replacement.

These objects and other advantageous ends in the structure, arrangement and combination of parts, to which my invention relates, are now to be described, reference being had to the accompanying drawings, wherein the like reference characters designate corresponding parts throughout the several views.

Figure 1 is the sectional view of the valve fitting in affixation with the bed of a receptacle and a standard drain pipe.

Figure 2 is a plan view of the valve fitting per se.

Figure 3 is a plan view of the valve fitting per se with the strainer element removed.

Figure 4 is a plan view similar to the view of Figure 3 with the upper element of the valve mechanism removed.

From the above set forth figures, 1 represents the casing of a valve fitting made of any resisting material, such as brass and comprises a channel limited by three communicating walls, the uppermost being of the greatest radius and cylindrical in form, the intermediate being conical and the under-wall being cylindrical, all as best shown in Figure 1. The casing 1 at its upper limit is provided with a horizontal and annular flange 3 counter-bored at its inner perimeter to receive strainer 7. The lower wall of the said casing at its external surface is threaded as shown at 13 on Figure 1 to engage with the terminal of the drain pipe. The upper surface of the strainer or disc 7 is coextensive with the upper surface of the horizontal and annular flange 3 aforementioned. Progressing downwardly the radial difference between the upper wall and the intermediate conical wall, of the channel of casing 1 affords a seat onto which pin projections 10 are concentrically arranged for a fixed disk, element 11 of the valve mechanism. 8 is a conical cup with its small diameter at the lower side, which in conjunction with disk 11 constitutes the valve mechanism.

Casing 1 is affixed in the usual way to the bed receptacle, so that the upper, horizontal and annular flange of the same is coextensive with the bed of the said receptacle, preferably as shown in Figure 1.

The conical section of the channel of casing 1 is provided with a slot 17, through which lever 6 passes, as illustrated in Figure 1, and about which more will be said hereinafter.

Annular plate 11 being the upper element of the valve proper, is provided with a central aperture and concentrically of the latter is a series of spaced radially disposed and substantially segment shaped openings through which is adapted to flow water from the kitchen sink, basin, tub, or other like receptacle, to the drain or waste pipe. At the periphery of annular plate 11 are orifices adapted to engage pins 10 projecting from the seating between the upper and intermediate sections of the channel of casing 1. 8 is the under-element of the valve mechanism and is a conical cup tapering downwardly. The said cup mortises with the intermediate conical section of the channel of casing 1, the upper surface of the said cup being provided with a central aperture through which spindle 16 passes. The said spindle 16 is preferably permanently affixed to the inner surface of casing 1 at the lower end of section 13 as seen in Figure 1, the said spindle 16 being provided with an external thread on the upper end thereof. The upper end of spindle 16 is provided with an internal thread to receive flat topped screw 12, which affixes strainer 7 to the counter-bore of the annular and horizontal flange 3 of casing 1.

The aperture of annular plate 11 and conical cup 8 allow the penetration of spindle 16 there-through. Conical cup 8 at the top surface is provided with a plurality of radially disposed segment shaped openings, which are adapted to register with the openings in annular plate 11 when water is to be drained or let out of the particular plumbing fixture to which my fitting is applied. On the under part of the top end of cup 8 and on a non-perforated portion is a burr 9 integral with the thickness of the top end of element 8 and is provided with a female screw that penetrates the wall of cup 8 on one side and terminates in a recess on the other side within the burr 9 as best shown in Figure 1 of the accompanying drawings.

The top end or upper surface of conical cup 8 may be designated as the cut-off plate with respect to annular plate 11, by reason of the fact that the non-perforated portions thereof are adapted to close the openings of annular plate 11 in a manner to be subsequently described. Respecting spindle 16 at its upper end, locknut 14 and coil spring 15, together with washer thereunder 19 surround the threaded portion of the said spindle 16 for regulation of bearing tension between annular plate 11 and upper surface of the cut-off plate of conical cup 8. 6 is a lever provided with a male screw on one end and passes through slot 17 of casing 1, in order to engage with the female screw of burr 9 of the conical cup 8. Slot 17, as best illustrated in Figure 1 of the accompanying drawings, is just large enough to give lever 6 that limited horizontal rotation which effects a plate closure or registration of the segments of annular disk of plate 11 and conical cup 8.

The installation of the valve fitting comprising my invention is indeed a simple affair. The port or opening of the particular plumbing fixture, to which the fitting is applied, is prepared in any known way to the arts, such as illustrated in Figure 1, wherein A represents the section of the bed of a fixture adapted to receive flange 3 of casing 1 and adapted to receive a gasket 5 to prevent possible leakage. The nipple or lower section of casing 1 designated by numeral 13 communicates with the channel of the drain or waste pipe by any means, such as a coupling.

The modus operandi of the valve fitting comprising my invention is as simple as the structure itself. Perforated disc or strainer 7, which is fastened to the counter-bore of the inner edge of flange 3 by screw 12 serves as a safe-guard against the entry of solid and clogging material to both the bearing surfaces of the valve elements 11 and 8 and the channel of the drain pipe. Annular plate or disc 11 is affixed by means of pins 10 to the seat on which it rests. The upper surface of conical cup 8 affording the cut-off plate is limitationally rotatable about annular plate 11, and about spindle 16 as a bearing, the ease of rotation depending upon the extent to which locknut 14 is advanced. The limited rotation of conical cup 8 is effected by the engagement of the female screw of burr 9 by the male screw termination of lever 6, the latter penetrating the same externally from casing 1 through slot 17 thereof, the width of the said slot 17 determining the juxtaposition of the segments or the non-perforate portions of the valve elements 11 and 8 for the opening or closing of the same. Lever 6 may project from the front wall of the fixture to which the fitting is applied enough to push it to the right or left by the person in charge for opening or closing the valve, or the lever 6 may extend rearwardly with an upright attached thereto and penetrating the rear and flanged wall portion of the fixture through a slot thereof for purposes of opening and closing the valve. The bearing surfaces of elements 11 and 8 and between spindle 16 and the central apertures may be oiled or greased for the usual reasons.

Cup 8 in its conical shape is significant in minimizing the effect of water flowing back from the drain pipe. From the standpoint of hydraulics this minimization of back pressure manifests itself to those versed in the art.

It is preferable that all the elements of the valve fitting of my invention be of brass or other non-corrosive and enduring materials.

Annular plate 11 and element 8 of the valve mechanism are of substantial thickness; so that in the event of foreign and solid matter penetrating the bearing surface plane, the same will be ground to a powder by the shearing force of the partial revolutions of element 8. Of course, all the other elements of the fitting correspond in sturdiness to the functions played by each. If the valve proper should cease to function for any reason, lever 6 is disengaged, the strainer 7 is unscrewed, and the integral valve mechanism is disengaged from the casing 1 ready for any repair or replacement.

I wish it understood that the embodiment of my invention is solely for purposes of disclosure, there being no limitations to any specific construction; minor changes in size, shape and arrangement of parts, minor variations and modifications of details may all be resorted to without departing from the spirit of my invention nor enlarging its scope within the appended claims.

I claim:

1. In combination with the casing as described of a valve fitting for a plumbing fixture, a valve mechanism adapted to telescope with the interior of the said casing and comprising an upper annular disc provided with perforations and concentric peripheral orifices, the said orifices being adapted to engage with pin projections off the casing, an under conical cup with perforations on the upper surface adapted to cut off and register with the perforations of the upper annular disc, the said under conical cup being provided with an internally threaded burr on the under surface, means of adjustable connection between the upper annular disc and the under conical cup, and external means cooperating with the said burr of limitationally rotating the under conical cup for purposes of opening and closing the valve mechanism.

2. In a valve fitting for a plumbing fixture, the combination of a casing provided with a horizontal slot, a valve mechanism consisting of a detachably fixed upper plate and a lower conical cup provided on the underside thereof with an internally threaded burr opening from the outer surface of the said conical cup, a lever passing through the said horizontal slot and engaging with the said burr to limitationally rotate the said lower conical cup for purposes of cutting off and registering the perforations situated on both the upper plate and under conical cup.

3. A valve fitting comprising in combination a two-part valve mechanism, a casing therefor comprising an upper wall terminating in a horizontal and annular flange, a strainer adapted to depend from the inner perimeter of the said flange, the above said casing having an intermediate conical wall tapering downwardly with the upper diameter smaller than the diameter of the upper wall to afford a seat for the upper element of the said valve mechanism, the said conical wall receiving the under-element of the valve mechanism, fastening means for the said upper element of the said valve mechanism, the intermediate conical wall of the casing being provided with a horizontal slot, an under wall communicating from the conical wall and being externally threaded, and a central spindle along the vertical axis of the casing projecting from the under wall to serve as a bearing for the elements of the valve mechanism.

4. A valve fitting comprising in combination a two-part valve mechanism, a casing comprising an upper wall terminating in a horizontal and annular flange, a strainer adapted to be contained within the upper wall, the said casing having an intermediate conical wall tapering downwardly and reduced in its larger diameter from the upper wall to afford a seat for the upper element of the valve mechanism, the conical wall being adapted to receive the under element of the said valve mechanism, fastening means on the said seat for the upper element of the valve mechanism, the said intermediate wall being provided with a horizontal slot, an under wall externally threaded for coupling with a drain pipe and a central spindle along the vertical axis of the casing being affixed to the said under wall and being threaded externally and internally at the upper end.

BERNARD LUTSKY.